(12) United States Patent
Fabry

(10) Patent No.: US 11,206,766 B2
(45) Date of Patent: Dec. 28, 2021

(54) TREE INJECTION SYSTEM

(71) Applicant: Carl Fabry, Orlando, FL (US)

(72) Inventor: Carl Fabry, Orlando, FL (US)

(*) Notice: Subject to any disclaimer, the term of this patent is extended or adjusted under 35 U.S.C. 154(b) by 0 days.

(21) Appl. No.: 16/421,179

(22) Filed: May 23, 2019

(65) Prior Publication Data
US 2020/0015429 A1 Jan. 16, 2020

Related U.S. Application Data

(60) Provisional application No. 62/698,546, filed on Jul. 16, 2018.

(51) Int. Cl.
A01G 7/06 (2006.01)

(52) U.S. Cl.
CPC .................. A01G 7/06 (2013.01)

(58) Field of Classification Search
CPC .................. A01G 7/06; A01G 29/00
See application file for complete search history.

(56) References Cited

U.S. PATENT DOCUMENTS

| | | | |
|---|---|---|---|
| 1,756,453 A | 4/1930 | Davey et al. | |
| 3,295,254 A | 1/1967 | Schoonman | |
| 3,968,594 A | 7/1976 | Kawakami | |
| 3,992,813 A | 11/1976 | Freshel | |
| 4,158,269 A * | 6/1979 | Williams | A01G 29/00 111/7.1 |
| 4,989,366 A | 2/1991 | DeVlieger | |
| 5,239,773 A | 8/1993 | Doolittle, Jr. | |
| 5,797,215 A | 8/1998 | Doolittle et al. | |
| 6,192,623 B1 * | 2/2001 | Higginbotham | A01G 29/00 47/48.5 |
| 7,178,286 B1 | 2/2007 | Doolittle | |
| 8,132,362 B2 * | 3/2012 | King | A01G 29/00 405/45 |
| 8,671,614 B1 * | 3/2014 | Doolittle | A01G 29/00 47/57.5 |
| 2014/0283445 A1 * | 9/2014 | Chabot | A01G 29/00 47/48.5 |
| 2017/0071136 A1 * | 3/2017 | Andrews | A01G 7/06 |

* cited by examiner

Primary Examiner — Thanh Pham
(74) Attorney, Agent, or Firm — Christopher M. Ramsey; GrayRobinson, P.A.

(57) ABSTRACT

A tree injection device configured to inject a solution into a tree has a head defining an input opening for receiving the solution and a shank. The shank has a generally circumferential surface elongated along an axis and extending from the head to a pointed end opposite the head. The generally circumferential surface has a radially constricted section positioned between a first radially enlarged section and a second radially enlarged section. The first radially enlarged section and second radially enlarged section have substantially equal diameter. An output opening for delivering the solution is defined by the radially constricted section and is in fluid communication with the input opening by a passageway defined by an interior of the shank.

10 Claims, 7 Drawing Sheets

TREE INJECTION SYSTEM

CROSS-REFERENCE TO RELATED APPLICATION

This claims the benefit of priority to provisional Application No. 62/698,546. Filed Jul. 16, 2018, which is hereby incorporated by reference in its entirety.

BACKGROUND

Getting crop protection chemicals into trees by trunk injection for uptake via the xylem or phloem is an established and proven technique to rid trees of pests and treat nutrient deficiencies, especially where conventional application methods can be challenging and less effective. Although trunk injection can be effective, the devices used for trunk injection however are typically fragile and complicated to install and utilize.

Most trunk injection devices are only intended for a single use and must be used by highly trained personnel, research workers, or licensed expert pest control operators, and all on a small scale, generally for single, ornamental tree specimen. They are not designed for ease of insertion or use on a large scale, such as in an orchard, by lower skilled workers without any particular expertise in trunk injection.

BRIEF SUMMARY

What is needed is a new tree injection apparatus having tree injection devices that may be installed easily on a plurality of trees by workers who do not have specialized training in trunk injection and who do not need to pre-drill a hole in the trees in which to insert the devices.

An example of the apparatus is a tree injection device that has: (a) a head defining an input opening for receiving the solution; (b) a shank having a generally circumferential surface elongated along an axis and extending from the head to a pointed end opposite the head, the generally circumferential surface having a radially constricted section positioned between a first radially enlarged section and a second radially enlarged section, the first radially enlarged section and second radially enlarged section having substantially equal diameter; and (c) an output opening for delivering the solution, the output opening being (i) defined by the radially constricted section and (ii) in fluid communication with the input opening by a passageway defined by an interior of the shank.

Implementations of the apparatus may include one or more of the following features.

The apparatus where, when installed in a tree, the radially constricted section, first radially enlarged section, and second radially enlarged section together form a chamber within the tree where a crop protection solution is injected and contained within for uptake by the tree.

The apparatus where the tree injection device is configured to be inserted into a tree by a pressing for such as by hammering or using a nail gun, which drives the shank into the tree.

The apparatus where the generally circumferential surface is not threaded.

The apparatus where the first radially enlarged section extends from the head to the radially constricted section and the second radially enlarged section extends from the radially constricted section to the pointed end.

The apparatus where the head has a flat hammering surface opposite the pointed end and the input opening is within a recessed section of the hammering surface.

An example of a method of treating a tree includes injecting a treatment solution into a tree by: hammering a tree injection device into the tree, the tree injection device having: (a) a head defining an input opening, the head receiving the hammer; (b) a shank having a generally circumferential surface elongated along an axis and extending from the head to a pointed end opposite the head, the generally circumferential surface having a radially constricted section positioned between a first radially enlarged section and a second radially enlarged section, the first radially enlarged section and second radially enlarged section having substantially equal diameter; and (c) an output opening (i) defined by the radially constricted section and (ii) in fluid communication with the input opening by a passageway defined by an interior of the shank. The method also includes providing the treatment solution through the input opening to the output opening to deliver the treatment solution to an inside of the tree.

Implementations of this method may include one or more of the following features.

The method where, when the tree injection device is installed in a tree, the radially constricted section, first radially enlarged section, and second radially enlarged section together form a chamber within the tree where the treatment solution is injected and contained for uptake by the tree.

The method where hammering drives the shank into the tree until a collar of the head abuts an exterior of the tree.

The method where the generally circumferential surface is not threaded.

The method where the first radially enlarged section extends from the head to the radially constricted section and the second radially enlarged section extends from the radially constricted section to the pointed end.

The method where the head has a flat hammering surface opposite the pointed end and the input opening is within a recessed section of the hammering surface.

The method where the tree injection device is not hammered into a pre-drilled hole in the tree.

The method further including, prior to hammering, selecting a plurality of the tree injection devices for installation, the tree injection devices being linked together by conduit through which the crop protection solution can flow simultaneously. to a multiple number of trees to be treated.

An example of a method of making a species specific tree injection device includes: identifying a depth at which phloem is located beneath a tree's bark; preparing a tree injection device having: (a) a head defining an input opening for receiving the solution, the head having a collar that abuts the tree when the tree injection device is installed in a tree; and (b) a shank having a generally circumferential surface elongated along an axis and extending from the head to a pointed end opposite the head, the generally circumferential surface having a radially constricted section positioned between a first radially enlarged section and a second radially enlarged section, the first radially enlarged section and second radially enlarged section having substantially equal diameter. This method also includes forming, at a distance from the collar substantially equal to the depth, an output opening through the radially constricted section such that the output opening is in fluid communication with the input opening by a passageway defined by an interior of the shank.

Implementations of this method may include one or more of the following features.

The method where, when installed in a tree, the radially constricted section, first radially enlarged section, and second radially enlarged section together form a chamber within the tree where the solution is contained for uptake by the tree.

The method where the generally circumferential surface is not threaded.

The method where the first radially enlarged section extends from the head to the radially constricted section and the second radially enlarged section extends from the radially constricted section to the pointed end.

The method where the head has a flat hammering surface opposite the pointed end and the input opening is within a recessed section of the hammering surface.

The method where the head and shank are made out of the same single piece of material.

DETAILED DESCRIPTION OF EXAMPLE EMBODIMENTS

Figure 1:
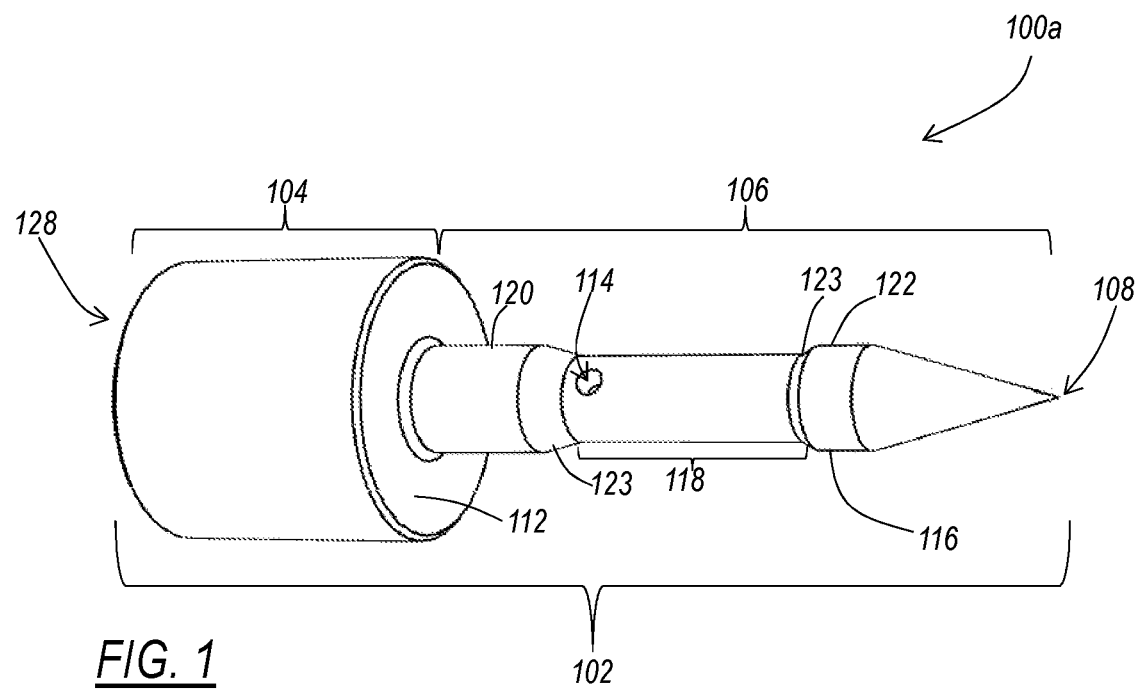
FIG. 1 is a front side perspective view of a first example of the tree injection device.
Figure 2:
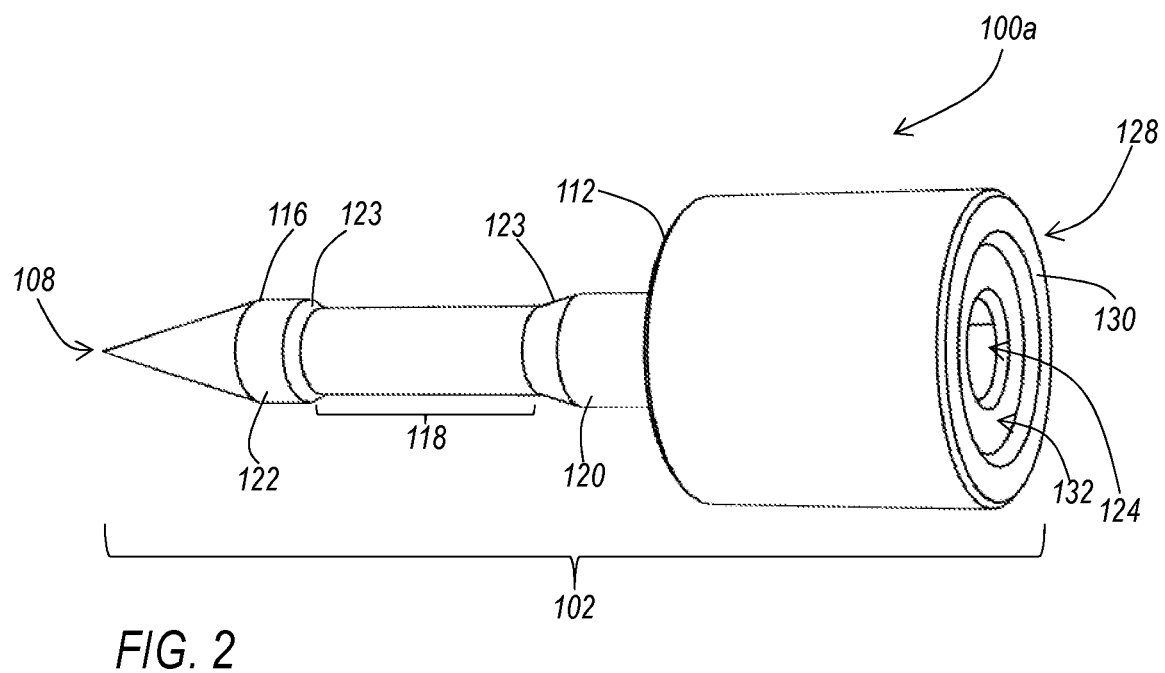
FIG. 2 is a back side perspective view of the tree injection device of FIG. 1.
Figure 3:
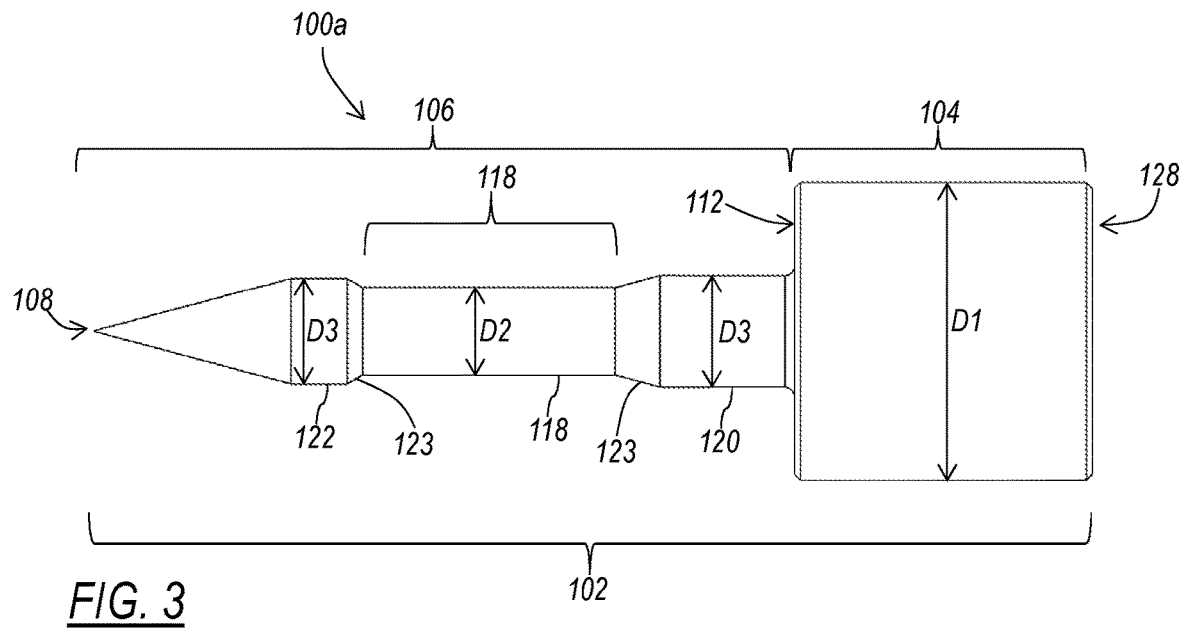
FIG. 3 is a side view of the tree injection device of FIG. 1.
Figure 4:
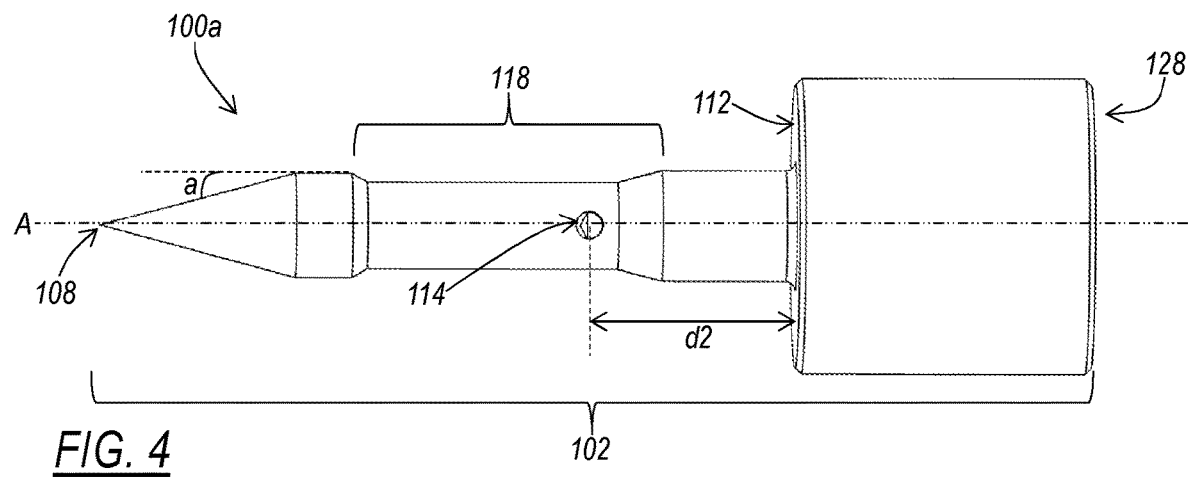
FIG. 4 is a side view of the tree injection device of FIG. 1 taken from the opposite side as FIG. 4.
Figure 5:
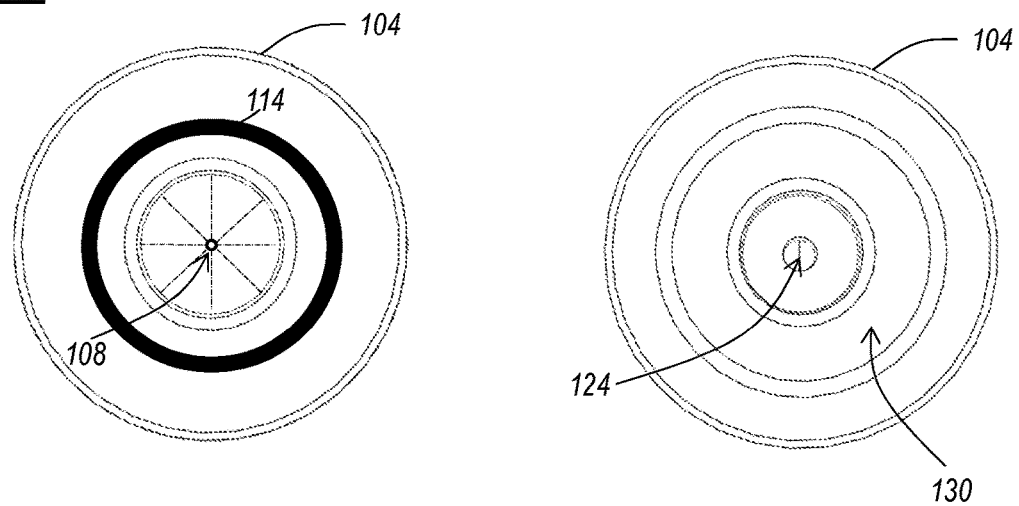
FIG. 5 is a front view of the tree injection device of FIG. 1.
Figure 6:
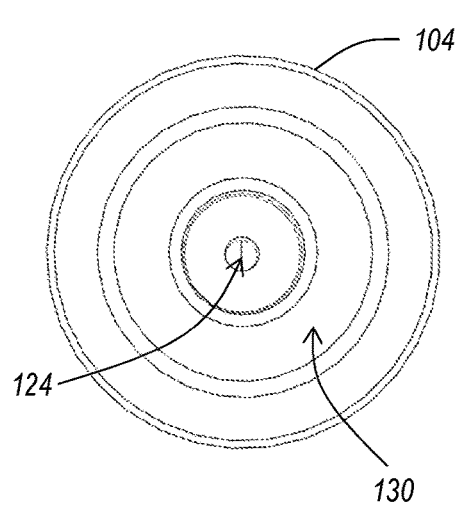
FIG. 6 is a rear view of the tree injection device of FIG. 1.
Figure 7:
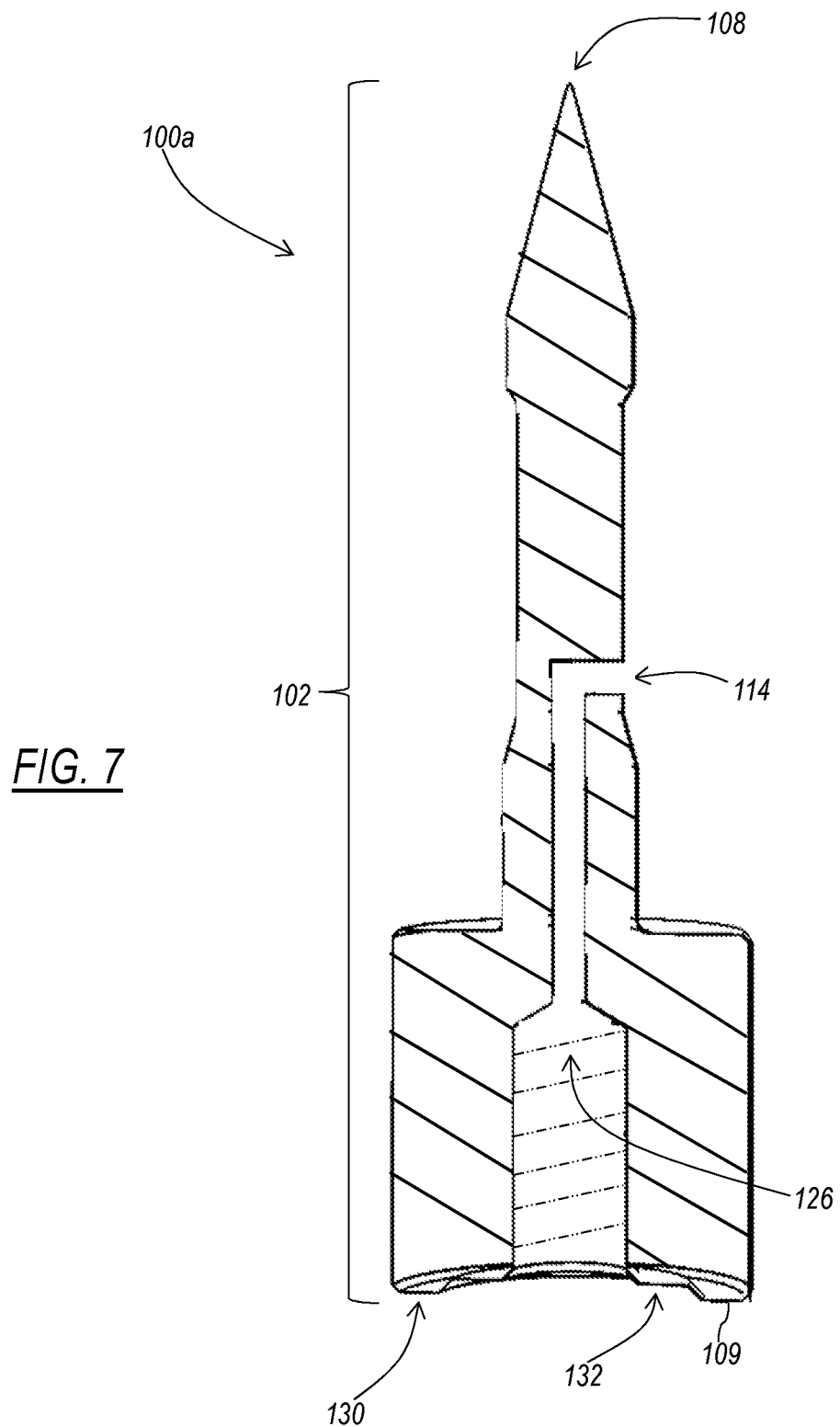
FIG. 7 is a side cutaway view of the tree injection device of FIG. 1.

This disclosure describes a tree injection system that addresses situations where many trees are involved requiring treatment by trunk injection or where it is desirable to have a simple to install tree injection device that does not require special equipment or training to install. This is particularly advantageous for use on orchard crops where hundreds or even of thousands of trees can be treated simultaneously, cost effectively, and efficiently. The device can be installed for sustained use, by orchard workers who are already knowledgeable in installing, operating, and maintaining low water volume irrigation systems. The ease of installation of the tree injection device is more efficient and may be more cost effective than the traditional tree injection systems currently available.

The device can remain in place for an undetermined length of time for multiple injections, with only minor maintenance, depending on tree growth, trunk expansion, and tree conditions. The source of the crop protection chemicals to be injected, can either be individually tree mounted, with chemical fluid bags or containers mounted elevated on each tree or, by an orchard manifold system (chemejection), where individual trees are connected and manifolded together to a central injection point or source. Such a system can be further very efficient and very cost effective by automation requiring very little labor, with programmed applications, in a scheduled and timely manner.

A first example of a tree injection device is now described by referring generally to FIGS. 1-7. The device 100a includes a body 102 that extends from a head 104 through a shank 106 to a pointed end 108. The body 102 may be generally cylindrical from the head 104 to the pointed end 108.

The head 104 is designed to allow the device 100a to be inserted into a tree by an insertion mechanism. Examples of suitable insertion mechanisms include, but are not limited to pressing force or hammering force such as by a handheld hammer or by a hammering device such as a nail gun type device. The head 104, shank 106, and pointed end 108 functions in a similar manner to a nail that can be driven into a tree. Accordingly, the device is constructed of high-strength material that is resistant to corrosion from weather or treatment chemicals, such as stainless steel or the like. Although not required in every example, the device 100a may have unitary construction such that it is made from a single piece of material that is machined to the desired shape.

The head 104 is configured to remain outside the tree when the shank 106 is embedded within the tree. In the example shown, the head 104 includes a treatment solution input opening 124 that receives treatment solution from an external source of the treatment solution.

A rear end 128 of the head 104 includes a hammering surface 130 defining a recess 132 in which the input opening 124 is positioned. Placing the input opening 124 in a recess 132 prevents damage to the input opening 124 when the device 100a is hammered into the tree.

The head 104 has a larger outer diameter D1 than the body shank 106. A collar 112 at a forward end of the head 104 is positioned to determine the maximum distance the shank 106 can be inserted within the tree. Accordingly, the collar 112 forms a stop that prevents the device 100a from being embedded in the tree any deeper than the collar 112. The collar 112 is substantially flat to abut the exterior surface of the tree.

A gasket 114 (shown in FIG. 5) such as an O-ring or the like may be fitted around the head 104 against the collar 112 to help prevent treatment solution from leaking out of the tree. The gasket 114 may include a pesticide carried by a fabric portion thereof, such as felt or the like, to prevent insect intrusion into the tree when the device is installed. Likewise a mechanical sap backflow prevention device may be incorporated in the device 100a if desired.

The shank 106 has a generally circumferential surface 116 including a radially constricted section 118 having a diameter D2 The radially constricted section 118 is positioned between a first radially enlarged section 120 and a second radially enlarged section 122 having a diameter D3, thereby forming a depression in the shank 106.

Certain examples of the circumferential surface 116 are smooth and without threads in order to minimize friction when inserting into a tree.

The radially constricted section 118 defines at least one output opening 114 in fluid communication with a treatment solution passage 126 defined by an interior of the device 100a to allow a treatment solution to be delivered to the tree through the output opening 114.

Joining the first radially enlarged section 120 and section radially enlarged section 122 to the radially constricted section 118 is a set of shoulders 123. These shoulders 123 are sloped to provide structural strength to the diameter-reducing joints to prevent bending during insertion. The shoulders 123 also allow for smoother insertion by limiting areas where tree material can become stuck during insertion and removal.

The collar 112 and the output opening are spaced a distance d apart. This distance d is determined for each type and size of tree to be treated in order to deliver the treatment solution to the desired depth within the tree such as the phloem and/or xylem for uptake by the tree. Accordingly, when the device 100a is be made, the output opening 114 can be drilled into the shank 106 such that the distance d is substantially equal to the depth of the xylem or phloem beneath the tree's bark.

The overall length of the device 100a along its cylindrical axis A will vary based on the type and size of tree being treated. In typical examples the length may range from about ½ inch to several inches, from ½ inch 6 inches, ½ inch to 4 inches, or from ½ inch to 4 inches, for example.

The diameter D3 of the first radially enlarged section 120 and the second radially enlarged section 122 may also vary, but is typically selected to allow for ease of penetration into the tree with a standard handheld hammer. These diameters may also be substantially equal for reasons explained later. Some examples of the diameter D3 are from 1/16 inch to 1 inch, or ¼ inch to ⅜ inch The diameter D2 of the radially constricted section 118 is less than D3, but is preferably not so small that the shank 106 will bend easily during insertion. By way of example the diameter D2 may be 20% to 80% of diameter D3.

The point of the pointed end 108 may be sharpened to assist with penetration into the tree. In certain examples, the sharpened angle a may be set at 25 degrees to 45 degrees relative to a line running along the generally circumferential surface 116 at the second radially enlarged section 122.

Figure 8:
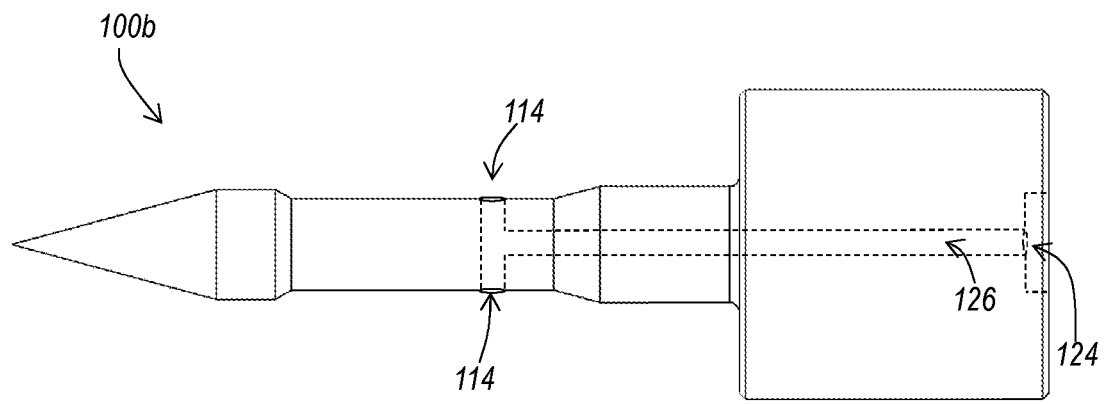
FIG. 8 is a side view of a second example of a tree injection device.

Referring to FIG. 8, a second example of the device 100b is similar in design to that of FIGS. 1-7, but it has a pair of opposed output openings 114 in the radially constricted section 118.

The output opening(s) 114 may be positioned anywhere along the radially constricted surface 118. The optimum position of the output opening(s) 114 along the radially constricted surface 118 will depend on the type and size of the tree that will be treated. Further, other versions may include multiple output openings 114 located at different distances d along the length of the radially constricted surface 118.

Figure 9:
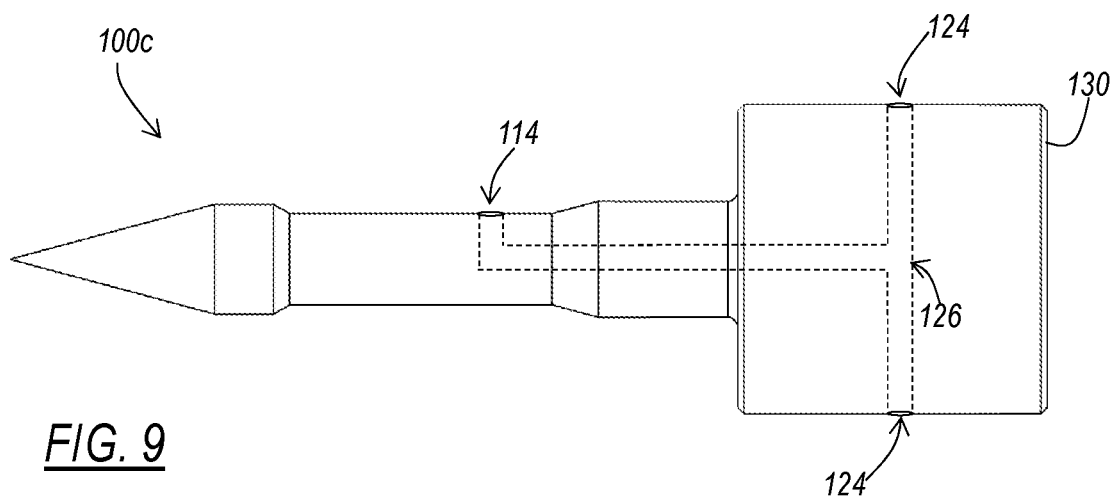
FIG. 9 is a side view of a third example of a tree injection device.

Referring to FIG. 9, a third example of the device 100c is similar in design to that of FIGS. 1-7, but it has a T-shaped directional coupler 128 built in to the head 104. In this example, conduits for delivering treatment solution may be attached forward the hammering surface 130 to introduce the treatment solution to the treatment solution passage 126.

Figure 10:
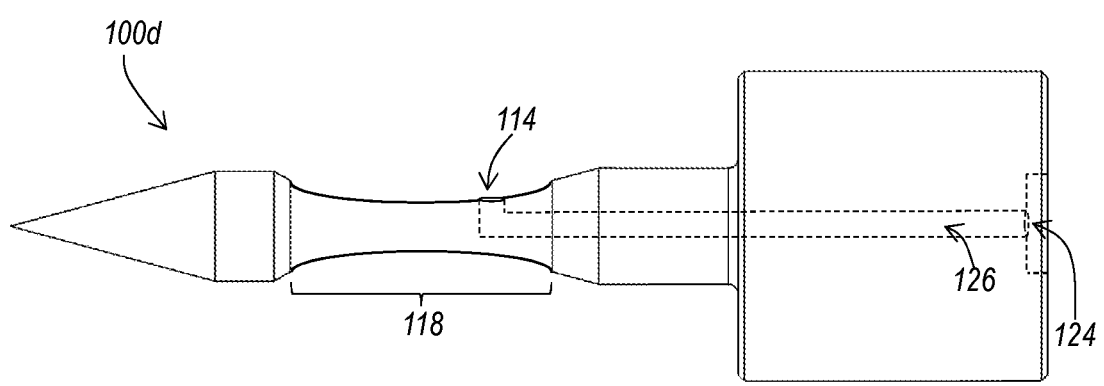
FIG. 10 is a side view of a fourth example of a tree injection device.

Referring to FIG. 10, a fourth example of the device 100d is also similar in design to that of FIGS. 1-7, except that the radially constricted section 118 has concave curvature.

Figure 11:
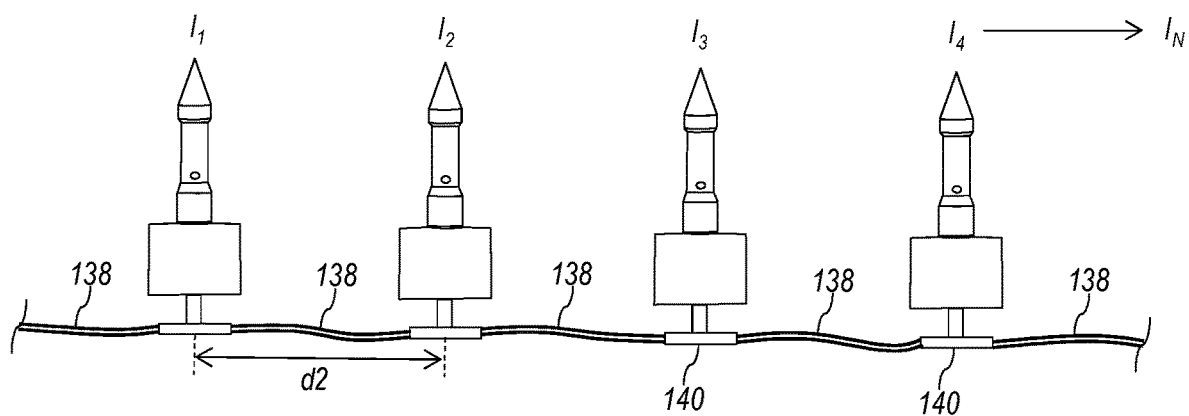
FIG. 11 is a view of a plurality of the injection devices linked together in series.

Referring to FIG. 11, the device 100a may be connected in series to a plurality of other devices 100a via a conduit 138 such as tubing or the like that delivers the treatment solution to each device 100a. The number of devices in the series is number $I_1, I_2 \ldots I_N$ where N represents the total number. Each device 100a may be coupled to the conduit 138 via a directional coupler 140 such as a T-shaped connector coupled to the devices 100a at the input opening 124. The distance d2 between devices 100a in the series will vary depending on the type and size of tree being treated. Examples of some typical distances are 2 inches to 6 inches, but this can vary as desired by the user.

Constructing the devices 100a in series in such a manner is advantageous for several reasons. Workers installing the devices 100a into trees can remove a long strip of devices 100a connected in series from the container dispensing the devices 100a, select the desired number of devices 100a to be inserted into the tree, and cut the conduit 138 to obtain the desired number of devices 100a. This saves the worker a considerable amount of time, especially when the worker has to treat a large number of trees such as in an orchard or grove. The directional coupler 140 may be removed when hammering the devices 100a into the tree.

Figure 12:
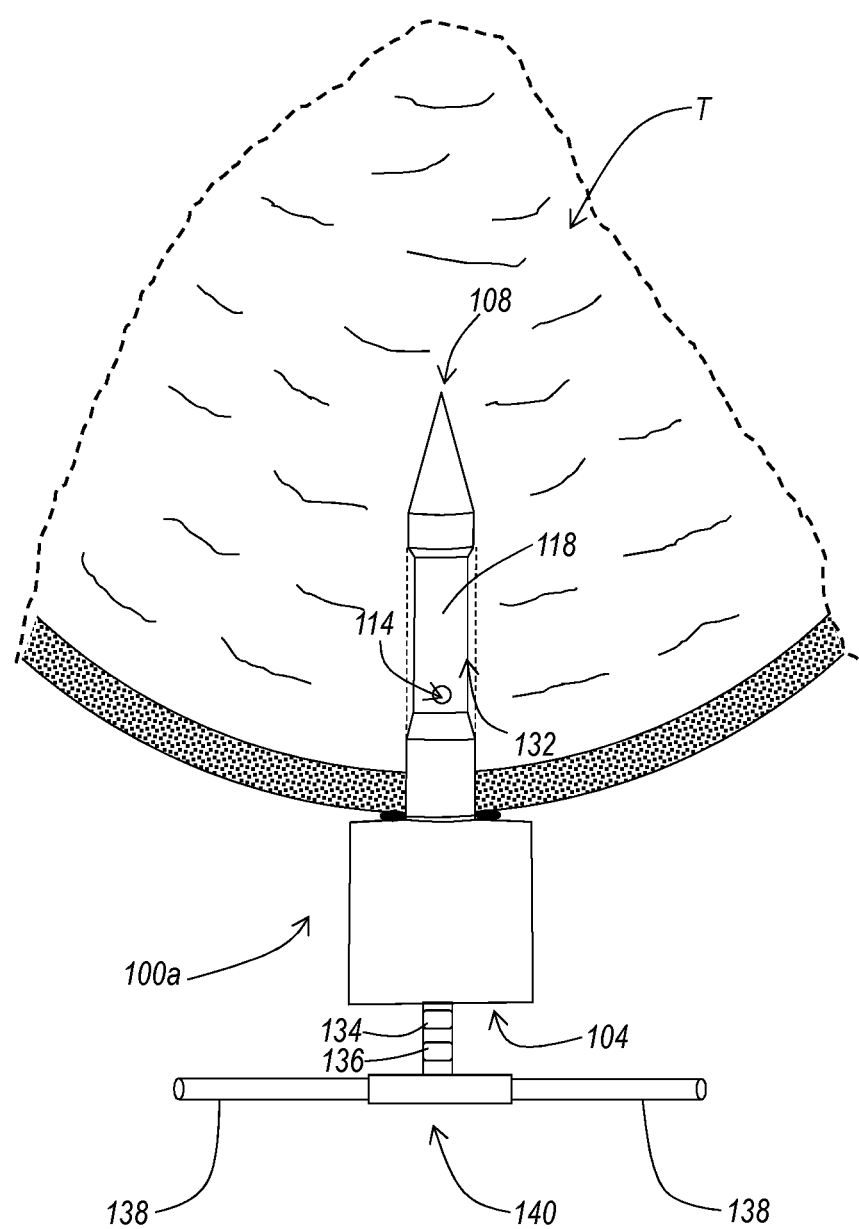
FIG. 12 is a partial view of a tree with the tree injection device of FIG. 1 inserted therein.

FIG. 12 illustrates a device 100a inserted into a tree T in order to show several important functions of the device's 100a construction. The depression in which the radially constricted surface 118 and output opening 114 are located serves as a mechanism for locking the device 100a within the tree T, thereby helping to prevent the device 100a from slipping out of the tree over time. Second, locating the output opening 124 in the depression provides a pocket 132 between the tree material and the radially constricted surface 118. This pocket 132 creates a substantially unobstructed space for the treatment solution to enter for uptake by the tree T and prevents clogging of the output opening 132 when the device 100a is inserted into the tree.

In certain examples of the device 100a, a check valve 134 and a debris filter 136 are included and placed in the flow stream of the treatment solution. The check valve 134 prevents back flow of the treatment solution after it has entered the treatment solution passage 126. The debris filter 136 filters debris that may be carried by the treatment solution to prevent the debris from entering the treatment solution passage 136 and clogging the output opening 124.

Figure 13:
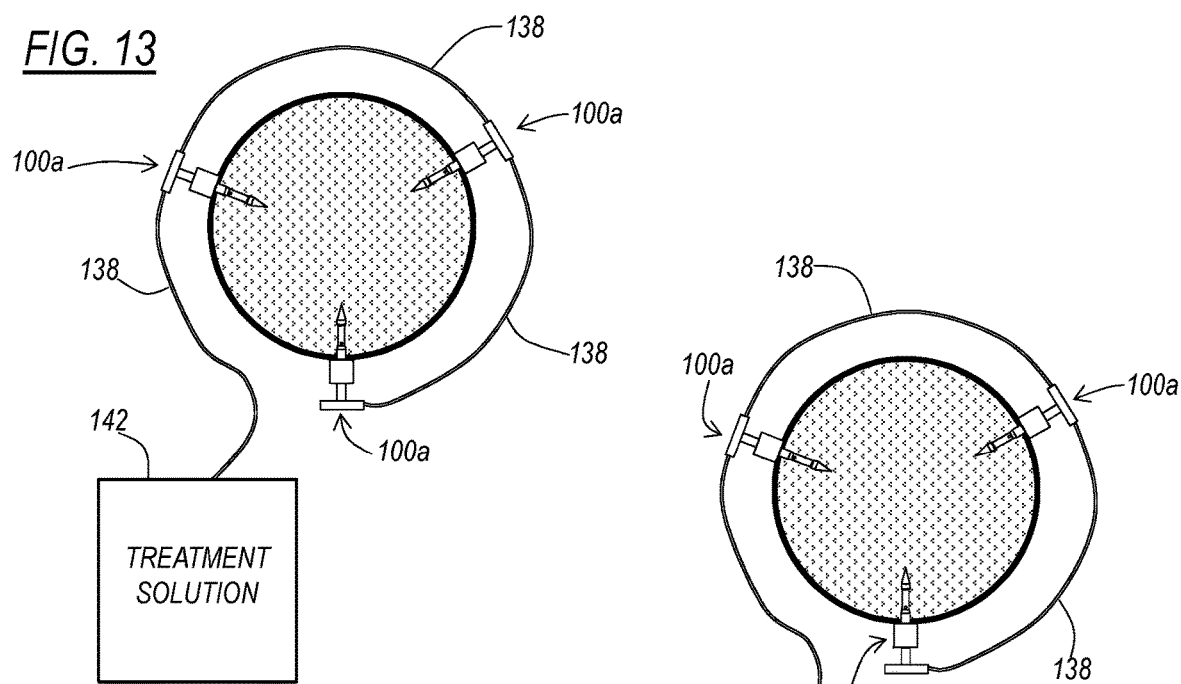
FIG. 13 is a schematic illustrating a tree injection system installed on a tree with the tree horizontally sectioned for ease of viewing.

Referring to FIG. 13, a tree injection system including a plurality of devices from FIGS. 11 and 12 are installed on a tree T with the tree horizontally sectioned for ease of viewing. A treatment solution source 142 such as a container holding the treatment solution is connected via a conduit 138 to the devices 100a. The treatment solution source 142 may be pressurized to move treatment solution through the conduit 138 into the devices 100a and thereby into the tree T.

Figure 14:
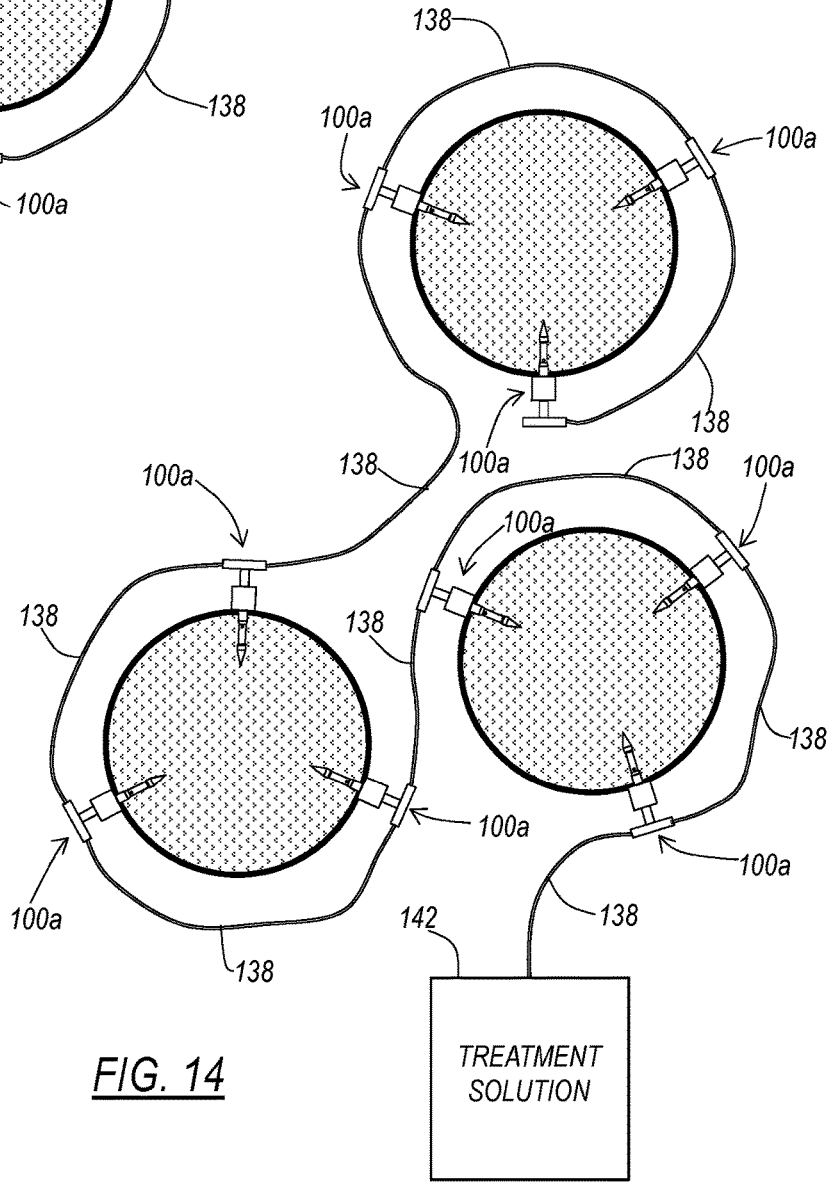
FIG. 14 is a schematic illustrating a tree injection system installed on a plurality of trees with the trees horizontally sectioned for ease of viewing.

Referring to FIG. 14, when many different trees are to be treated at the same time, the treatment solution source 142 can function as the central manifold for the entire system. The system may be automated to deliver treatment solution at a desired dose and/or time by using a control device such as a computer controlled injection system with dose and timing programming instructions. In order to connect the apparatus to other trees, an additional directional coupler 140 may be placed in line to direct treatment solution to other devices installed on other trees. Such an arrangement allows the system to treat many trees at the same time.

The size and location of the treatment solution source 142 can vary depending on the number of trees being treated. When only a few trees are being treated the treatment solution source 142 may be a container positioned above the location of the devices 100a in the trees. This allows the treatment solution to flow by gravity to the devices 100a. If desired, such a treatment solution source 142 may be pressurized to assist flow of the treatment solution out of the treatment solution source 142 to the devices 100a in the trees.

When a grove of trees is being treated, the treatment solution source 142 may be a large container such as a tank located proximal to the grove. Such a treatment solution source 142 may be in fluid communication with a distribution manifold in fluid communication with the devices 100a inserted in trees to deliver the treatment solution to the devices 100a.

It is to be understood that the example used in FIGS. 11-14 may be substituted with any of the other examples of the device 100a-d. Likewise, it is to be understood that any of the features shown and described in connection with a particular example of the device 100a-d may be used in connection with any of the other examples of the device 100a-d.

The device may be made of any suitable material such as metal, plastic or a combination thereof. In some cases, the device may be made of stainless steel to prevent corrosion due to weather or treatment chemicals. In some cases, the device may be machined from a single piece of metal that it has single-piece unitary construction. Single piece construction provides structural integrity to prevent bending or breaking during insertion or removal of the device from the tree. The treatment solution passage may formed by a convention mechanism such as drilling into the material with diameter specific size holes in order to facilitate substantially equal pressure amongst all the output openings.

The treatment solution may include any chemical(s) beneficial to a tree such as nutrients, pesticides, antibiotics, antifungals, etc. The active ingredient may be, if desired, blended in a solvent for delivery.

The device may advantageously function as both the insertion tool and the delivery tool for the treatment solution. This makes delivery to the tree more efficient by not requiring extra tools or equipment to first form a hole in the tree and then insert the injection device into the hole as is required in many conventional tree injection systems. Due to the construction of the device, it can be inserted into the tree without inserting it into a pre-drilled hole in the tree.

This disclosure describes exemplary features and embodiments, but not all possible features and embodiments of the device, system, and method. Where a particular feature is disclosed in the context of a particular example, that feature can also be used, to the extent possible, in combination with and/or in the context of other examples. The device, system, and method may be embodied in many different forms and should not be construed as limited to only the examples described here.

The device, system, and method are not limited to the details described in connection with the example embodiments. There are numerous variations and modification of the compositions and methods that may be made without departing from the scope of what is claimed.

That which is claimed is:

1. An apparatus comprising:
a tree injection device configured to inject a solution into a tree trunk, the tree injection device having:
(a) a head defining an input opening for receiving the solution;
(b) a shank having a generally circumferential surface elongated along an axis and extending from the head to a pointed end opposite the head, the generally circumferential surface having a radially constricted section positioned between a first radially enlarged section and a second radially enlarged section, the first radially enlarged section and second radially enlarged section having substantially equal diameter, wherein the first radially enlarged section extends from the head to the radially constricted section and the second radially enlarged section extends from the radially constricted section to the pointed end; and
(c) a first shoulder joining the first radially enlarged section to the radially constricted section, the first shoulder forming a sloped diameter-reducing joint between the first radially enlarged section and the radially constricted section;
(d) a second shoulder joining the second radially enlarged section to the radially constricted section, the second shoulder forming a sloped diameter-reducing joint between the second radially enlarged section and the radially constricted section; and
(e) an output opening for delivering the solution, the output opening being (i) defined by the radially constricted section and (ii) in fluid communication with the input opening by a passageway defined by an interior of the shank.

2. The apparatus of claim 1, wherein, when installed in a tree trunk, the radially constricted section, the first radially enlarged section, and the second radially enlarged section together form a chamber within the tree trunk where the solution is injected and contained for uptake by the tree trunk.

3. The apparatus of claim 1, wherein the tree injection device is configured to be inserted into a tree trunk by hammering the head which drives the shank into the tree trunk.

4. The apparatus of claim 1, wherein the tree injection device is configured to be inserted into a tree trunk by applying a pressing force against the head, which drives the shank into the tree trunk.

5. The apparatus of claim 1, wherein the generally circumferential surface is not threaded.

6. The apparatus of claim 1, wherein the head has a flat hammering surface opposite the pointed end and the input opening is within a recessed section of the hammering surface.

7. The apparatus of claim 1, wherein the tree injection device is configured to inject the solution into a tree trunk by being inserted directly into the tree trunk.

8. The apparatus of claim 1, wherein the head is radially enlarged relative to the first radially enlarged section.

9. The apparatus of claim 1, wherein the head includes a collar adjacent the first radially enlarged section, the collar extending radially outward relative to the first radially enlarged section.

10. The apparatus of claim 1, wherein the tree injection device is made of a single piece of material having unitary construction.

* * * * *